(12) United States Patent
Wilson et al.

(10) Patent No.: US 11,608,183 B2
(45) Date of Patent: Mar. 21, 2023

(54) AUTOMATIC EJECTION TIME DELAY SYSTEM

(71) Applicant: GOODRICH CORPORATION, Charlotte, NC (US)

(72) Inventors: Brian Wilson, Vacaville, CA (US); Jatin H. Solanki, Sacramento, CA (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 17/201,886

(22) Filed: Mar. 15, 2021

(65) Prior Publication Data
US 2021/0323684 A1  Oct. 21, 2021

Related U.S. Application Data (60) Provisional application No. 63/010,444, filed on Apr. 15, 2020.

(51) Int. Cl.
 *B64D 25/10* (2006.01)
(52) U.S. Cl.
 CPC .................... *B64D 25/10* (2013.01)
(58) Field of Classification Search
 CPC ................. B64D 25/08; B64D 25/10
 See application file for complete search history.

(56) References Cited

U.S. PATENT DOCUMENTS

| | | | |
|---|---|---|---|
| 3,281,097 A | 10/1966 | De Tienne | |
| 3,862,731 A * | 1/1975 | McIntyre | B64D 25/10 244/122 A |
| 4,057,206 A * | 11/1977 | Duncan | B64D 25/10 73/204.19 |
| 4,527,758 A * | 7/1985 | Ayoub | B64D 17/58 244/150 |
| 4,721,273 A * | 1/1988 | Trikha | B64D 25/10 244/141 |
| 4,792,903 A * | 12/1988 | Peck | B64D 25/10 244/122 A |
| 4,911,382 A * | 3/1990 | Aronne | B64D 25/10 307/118 |
| 8,033,504 B2 | 10/2011 | Jones et al. | |
| 10,384,788 B2 | 8/2019 | Campbell et al. | |
| 2017/0297725 A1* | 10/2017 | Campbell | B64D 25/10 |

FOREIGN PATENT DOCUMENTS

CN  105620762  6/2016
EP  0256425  2/1988

OTHER PUBLICATIONS

United Kingdom Intellectual Property Office; United Kingdom Search Report dated Sep. 28, 2021 in Application No. GB2105302.0.

* cited by examiner

*Primary Examiner* — Richard G Davis
(74) *Attorney, Agent, or Firm* — Snell & Wilmer L.L.P.

(57) ABSTRACT

A control system for an ejection system may comprise an ejection seat, a canopy jettison system, a sensor, a controller, and a tangible, non-transitory memory configured to communicate with the controller, the tangible, non-transitory memory having instructions stored thereon that, in response to execution by the controller, cause the controller to perform operations comprising receiving an eject command, polling the sensor for a sensor data, receiving the sensor data, passing the sensor data to a time delay logic, determining via the time delay logic a time delay based on the sensor data, and actuating the ejection seat based on the time delay.

18 Claims, 6 Drawing Sheets

AUTOMATIC EJECTION TIME DELAY SYSTEM

CROSS-REFERENCE TO RELATED APPLICATIONS

This application claims priority to, and the benefit of, Provisional Patent Application No. 63/010,444, filed Apr. 15, 2020 and titled "AUTOMATIC EJECTION TIME DELAY SYSTEM," which is incorporated by reference herein in its entirety for all purposes.

FIELD

The present disclosure relates to escape systems, and more specifically, to ejection systems including time delays.

BACKGROUND

Ejection systems are designed to expel pilots from an aircraft cockpit. Ejection seats in high performance aircraft benefit from safely removing the pilot or other occupant from the stricken aircraft across a wide variety of aircraft speed regimes, altitudes and aircraft attitudes. Ejection systems typically include aircraft canopy ejection systems to clear the escape path for the ejection seat. However, the time for an aircraft canopy to clear the ejection seat egress envelope is heavily influenced by aircraft speed and orientation. High airspeed tends to remove the aircraft canopy faster than low airspeed. In this regard, traditional ejection present a hazard where the canopy may fail to clear the ejection seat escape envelope prior to egress. Unintended occupant contact with the canopy tends to cause severe and/or fatal injury to ejection seat occupants.

SUMMARY

In various embodiments, a control system for an ejection system may comprise an ejection seat, a canopy jettison system, a sensor, a controller, and a tangible, non-transitory memory configured to communicate with the controller, the tangible, non-transitory memory having instructions stored thereon that, in response to execution by the controller, cause the controller to perform operations comprising receiving an eject command, polling the sensor for a sensor data, receiving the sensor data, passing the sensor data to a time delay logic, determining via the time delay logic a time delay based on the sensor data, and actuating the ejection seat based on the time delay.

In various embodiments, the operations further comprise receiving a mode select command from a control interface, passing the mode select command to a mode select logic, determining via the mode select logic an ejection mode, passing the ejection mode to the time delay logic, selecting the time delay based on the ejection mode, and actuating the canopy jettison system based on the ejection mode. In various embodiments, the operations further comprise rotating a rotable component of an ordnance device, and enabling pyrotechnic communication with a pyrotechnic time delay based on the time delay and the rotation of the rotable component. In various embodiments, the operations further comprise actuating, by the controller, the canopy jettison system. In various embodiments, the time delay logic comprises a lookup table of a canopy jettison system operation time indexed to the sensor data. In various embodiments, the sensor data includes at least one of a velocity, an airspeed, an altitude, an aircraft orientation, or an atmospheric condition. In various embodiments, the sensor and the controller are integrated onboard the ejection seat. In various embodiments, the sensor comprises a pitot tube.

In various embodiments, a method of actuating an ejection system is disclosed comprising receiving, by a controller, an eject command, polling a sensor for a sensor data, receiving the sensor data, passing the sensor data to a time delay logic, determining via the time delay logic a time delay based on the sensor data, and actuating an ejection seat based on the time delay.

In various embodiments, the method includes receiving a mode select command from a control interface, passing the mode select command to a mode select logic, determining via the mode select logic an ejection mode, passing the ejection mode to the time delay logic, selecting the time delay based on the ejection mode, and actuating the canopy jettison system based on the ejection mode. In various embodiments, the method includes rotating a rotable component of an ordnance device, and enabling pyrotechnic communication with a pyrotechnic time delay based on the time delay and the rotation of the rotable component. In various embodiments, the method includes actuating a canopy jettison system. In various embodiments, time delay logic comprises a lookup table of a canopy jettison system operation time indexed to the sensor data. In various embodiments, the sensor data includes at least one of a velocity, an airspeed, an altitude, an aircraft orientation, or an atmospheric condition.

In various embodiments, an article of manufacture is disclosed including a tangible, non-transitory computer-readable storage medium having instructions stored thereon that, in response to execution by a controller, cause the controller to perform operations comprising receiving an eject command, polling a sensor for a sensor data, receiving the sensor data, passing the sensor data to a time delay logic, determining via the time delay logic a time delay based on the sensor data, and actuating an ejection seat based on the time delay.

In various embodiments, the operations further comprise receiving a mode select command from a control interface, passing the mode select command to a mode select logic, determining via the mode select logic an ejection mode, passing the ejection mode to the time delay logic, selecting the time delay based on the ejection mode, and actuating the canopy jettison system based on the ejection mode. In various embodiments, the operations further comprise rotating a rotable component of an ordnance device, and enabling pyrotechnic communication with a pyrotechnic time delay based on the time delay and the rotation of the rotable component. In various embodiments, the operations further comprise actuating a canopy jettison system. In various embodiments, time delay logic comprises a lookup table of a canopy jettison system operation time indexed to the sensor data. In various embodiments, the sensor data includes at least one of a velocity, an airspeed, an altitude, an aircraft orientation, or an atmospheric condition.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
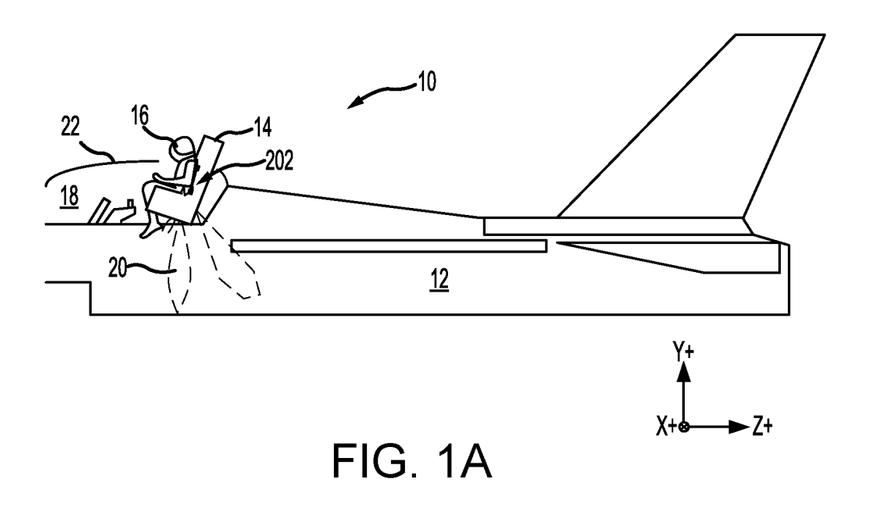
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20 such as, for example, a rocket catapult system included in the ejection seat 14. In this regard, ejection seat 14 may be configured to extract the ejection seat 14 from cockpit 18. Ejection system 10 includes a canopy jettison system configured to remove the canopy 22 of the cockpit 18. In various embodiments, an ejector system controller 202 (i.e., controller) configured to control ejection system 10 elements may be included aboard the aircraft 12 and/or the ejection seat 14.

Figure 1B:
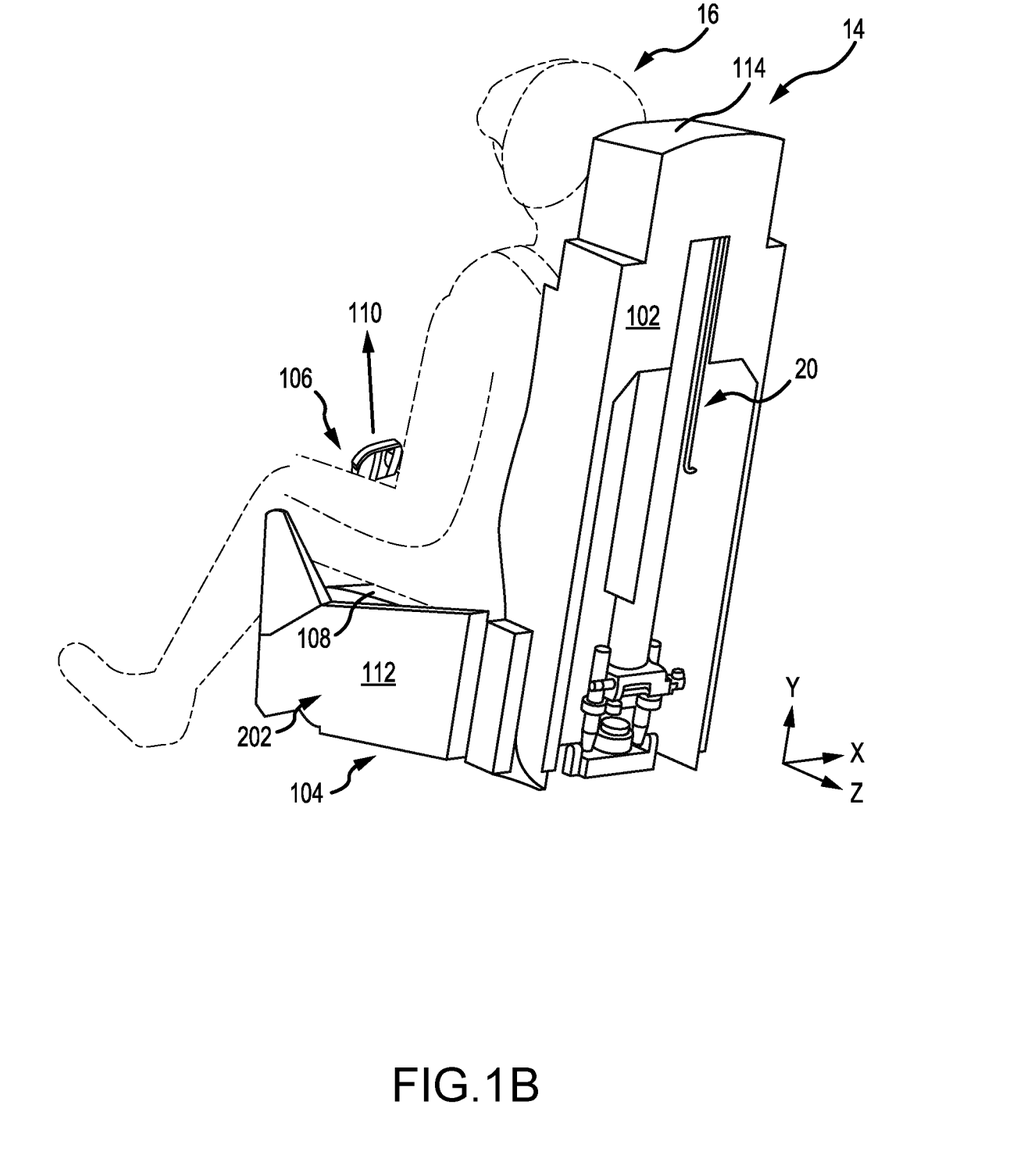
FIG. 1B illustrates an ejection seat of an aircraft ejection system, in accordance with various embodiments.

With additional reference to FIG. 1B, ejection seat 14 is illustrated with propulsion system 20 in an inactive state, in accordance with various embodiments. Ejection seat 14 includes a seat back 102 and a seat pan 104. The rocket propulsion system 20 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102. In various embodiments, the controller 202 may be located in the seat pan 104 of the ejection seat 14. Ejection handle 106 may be configured to initiate an ejection sequence upon actuation. For example, occupant 16 pulling ejection handle 106 in the direction of arrow 110 may activate the propulsion system 20 and/or may provide control signals to the controller 202. In this regard, pulling ejection handle 106 may cause separation of the canopy 22 and cause ejection seat 14 to be expelled from cockpit 18.

Figure 2:
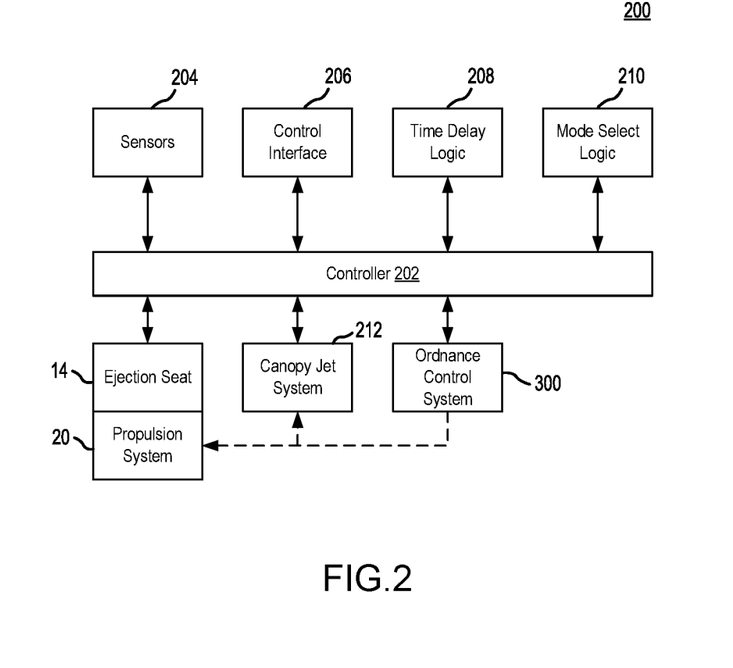
FIG. 2 illustrates a block diagram of a control system of an ejection system, in accordance with various embodiments.

With additional reference to FIG. 2, a block diagram of a control system 200 of ejection system 10 is illustrated in accordance with various embodiments. Each of the system 200 components may be configured to receive operative power independent of aircraft 15. In various embodiments, the controller 202 may be integrated into computer systems onboard the aircraft 12 or may be integrated into the ejection seat 14. Controller 202 may be configured as a central network element or hub to access various systems, engines, and components of system 200. In various embodiments, controller 202 may comprise a processor. In various embodiments, controller 202 may be implemented in a single processor. In various embodiments, controller 202 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 202 may comprise a processor configured to implement various logical operations in response to execution of instructions, for example, instructions stored on a non-transitory, tangible, computer-readable medium configured to communicate with controller 202.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, system 200 includes controller 202, one or more sensors 204, a control interface 206, a time delay logic 208, a mode select logic 210, a canopy jettison system 212, the ejection seat 14 and propulsion system 20, and an ordnance control system 300. Each of these systems may be in logical and/or operable communication with the controller 202. The controller 202 may be in electronic communication with the full suite of aircraft sensors and other data sources available within and without the aircraft such as, for example, GPS, radio beacons, remote commands and the like.

In various embodiments, sensors 204 may comprise a temperature sensor, a torque sensor, a speed sensor, a pressure sensor, a position sensor, an accelerometer, a pitot tube, a gyroscope, or any other suitable measuring device known to those skilled in the art. In various embodiments, one or more of the sensors 204 (e.g., a pitot tube) may be integrated aboard the ejection seat 14. Sensors 204 may be configured to measure a characteristic the aircraft 12 or aircraft and ejection system 10 components. Sensors 204 may be configured to transmit the measurements to controller 202, thereby providing sensor feedback about the system to controller 202. The sensor feedback may be, for example, a speed signal, or may be position feedback, temperature feedback, pressure feedback or other data. In various embodiments, the sensors 204 may provide sensor data including a velocity, an airspeed, an altitude, an aircraft orientation, an atmospheric condition, and/or other characteristics.

In various embodiments, the control interface 206 may comprise controls operable by the occupant 16 and provide communication with the controller 202. The control interface may comprise, for example, the ejection handle 106 and/or one or more, switches, dials, displays, buttons, pins, and/or the like. System 200 includes a canopy jettison system 212 operable by the controller 202 and configured to remove the canopy 22 from the cockpit 18 of the aircraft 12. In like regard, the ejection seat and propulsion system 20 are configured to egress from the aircraft 15 in response controller 202 receiving an eject command. In this regard the controller 202 may be configured to actuate the canopy jettison system and the ejection seat.

In various embodiments, the canopy jettison system 212 and/or the propulsion system 20 may be pyrotechnically actuated and be in pyrotechnic communication (dashed lines) with an ordnance control system 300. The ordnance control system 300 may comprise one or more ordnance devices operable by the controller 202 such as, for example, safe and arm devices, pyrotechnic delay devices, ordnance communications devices, gas generators, electro-explosive devices, and/or the like.

In various embodiments, controller 202 may include a time delay logic 208 and a mode select logic 210. In various embodiments, the time delay logic 208 may comprise a lookup table of a canopy jettison system operation time indexed to the sensor data. For example, an array of canopy jettison system operation times may be indexed to an array of airspeeds, aircraft velocities, aircraft orientations, and/or the like. The time delay logic 208 may output a time delay in response to the sensor data. In this regard, the time delay logic 208 may enable the controller 202 to determine a time delay based on the sensor data. In various embodiments, the controller 202 may actuate the ejection seat 14 based on the time delay. In this regard, the control system 200 tends to inhibit unintended ejection seat occupant contact with the canopy 22 by providing sufficient time delay between canopy separation and ejection seat actuation to enable the canopy to clear the ejection seat escape envelope prior to egress.

In various embodiments, the mode select logic 210 may be configured to determine an ejection mode based on sensor data. For example, the mode select logic 210 may determine between alternative ejection seat 14 egress modes such as a canopy jettison mode or a canopy fracture mode based on aircraft characteristics such as altitude, airspeed, and orientation. In various embodiments, the mode select logic 210 may determine the ejection mode in response to a mode select command. Controller 202 may receive the mode select command from the control interface 206 and pass the mode select command to the mode select logic 210. In various embodiments, the controller 202 may pass the ejection mode to the time delay logic 208. The time delay logic 208 may include a static or subset of time delays indexed to the ejection mode. In this regard, the controller 202 may select, via the time delay logic 208, the time delay based on the ejection mode. In like regard, the controller 202 may actuate the canopy jettison system based on the ejection mode.

Figure 3:
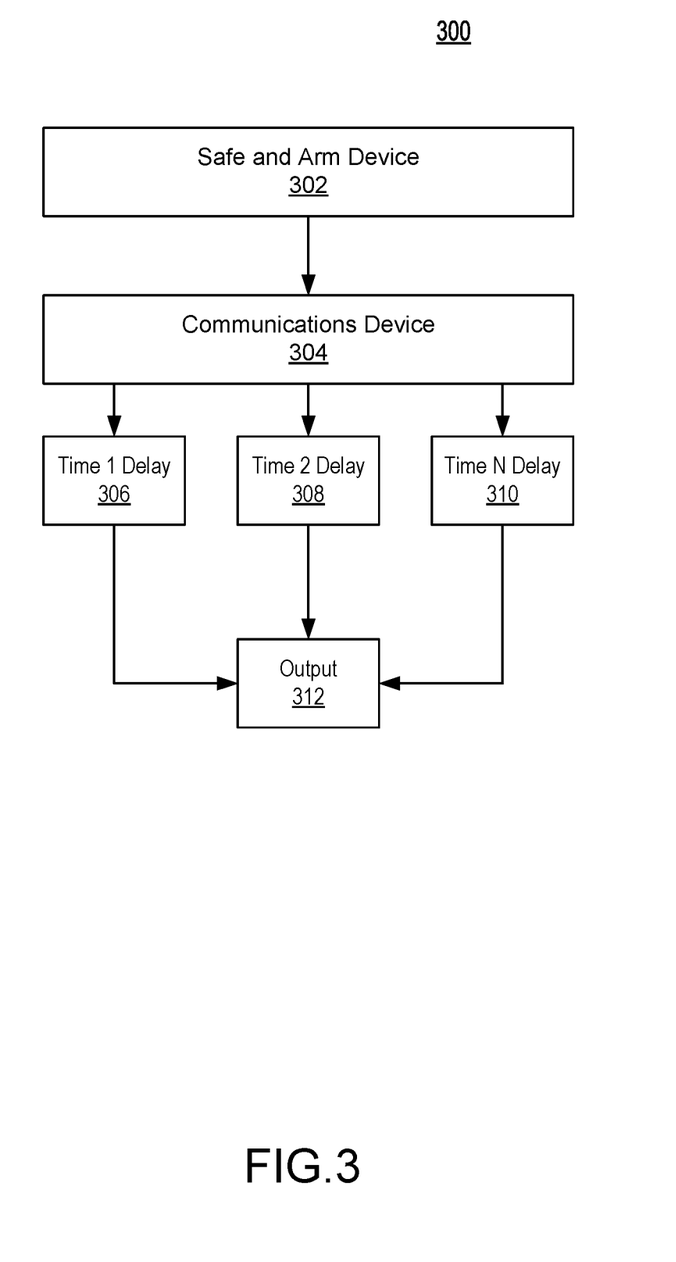
FIG. 3 illustrates a block diagram of an ordnance system, in accordance with various embodiments.

In various embodiments and with additional reference to FIG. 3, a block diagram of an ordnance control system 300 is illustrated. Ordnance control system 300 includes a safe and arm device 302, a communications device 304, and a plurality of pyrotechnic time delays e.g., a first time delay 306, a second time delay 308, and an Nth time delay 310. The safe and arm device 302 may be configured to receive an actuation command from the controller 202 and, in response, provide a pyrotechnic signal to the communications device 304. The communications device 304 may be configured to be controlled by the controller 202. The communications device 304 may select among the plurality of pyrotechnic time delays and enable pyrotechnic communication between the safe and arm device 302 and the selected pyrotechnic time delay such as, for example, the second time delay 308. The second time delay 308 may delay the pyrotechnic signal from the safe and arm device 302 and an output 312 such as, for example, an ordnance transmission line in communication with the propulsion system 20 and/or the canopy jettison system 212.

Figure 4:
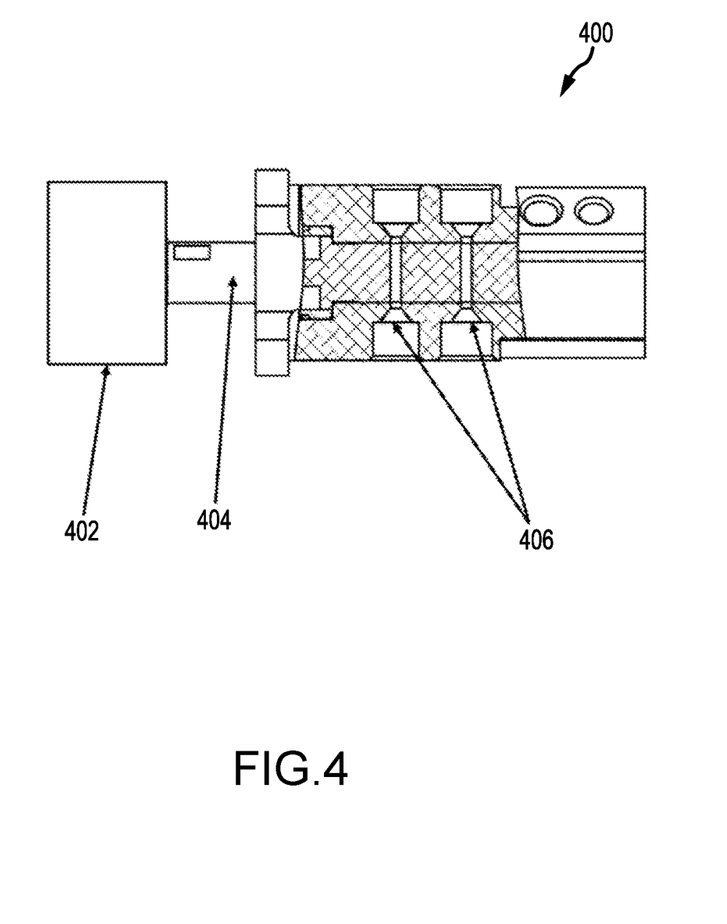
FIG. 4 illustrates an ordnance device of an ordnance system, in accordance with various embodiments.

In various embodiments and with additional reference to FIG. 4, an ordnance device 400 such as, for example, a safe and arm device or a communications device is illustrated. Ordnance device 400 includes an actuation module 402, a rotable component 404, and one or more communication channels 406. The actuation module 402 may be an electrical, mechanical, electromechanical, pneumatic, or other motor driven device in communication with the controller 202. The actuation module 403 may be configured to rotate the rotable component 404 to a predetermined position based on commands from the controller 202. For example, there may be a plurality of predetermined positions which align to allow one or more of the communications channels 406 to enable pyrotechnic communication between ordnance system components such as, for example, between the safe and arm device 302 and the first time delay 306. Although illustrated as gas channels, it will be appreciated that the communications channels may be electrical, ballistic, pneumatic, and/or any other suitable means for communicating an actuation signal between the controller 202 and actuatable ejection system 10 components (e.g., ejection seat 14, propulsions system 20, and/or canopy jettison system 212). In this regard, the controller 202 may rotate the rotable component 404 of the ordnance device 400 and enable pyrotechnic communication with a pyrotechnic time delay based on the calculated time delay and the rotation of the rotable component. Stated another way, the controller may select a pyrotechnic time delay corresponding to the time delay calculated via the time delay logic 208.

Figure 5:
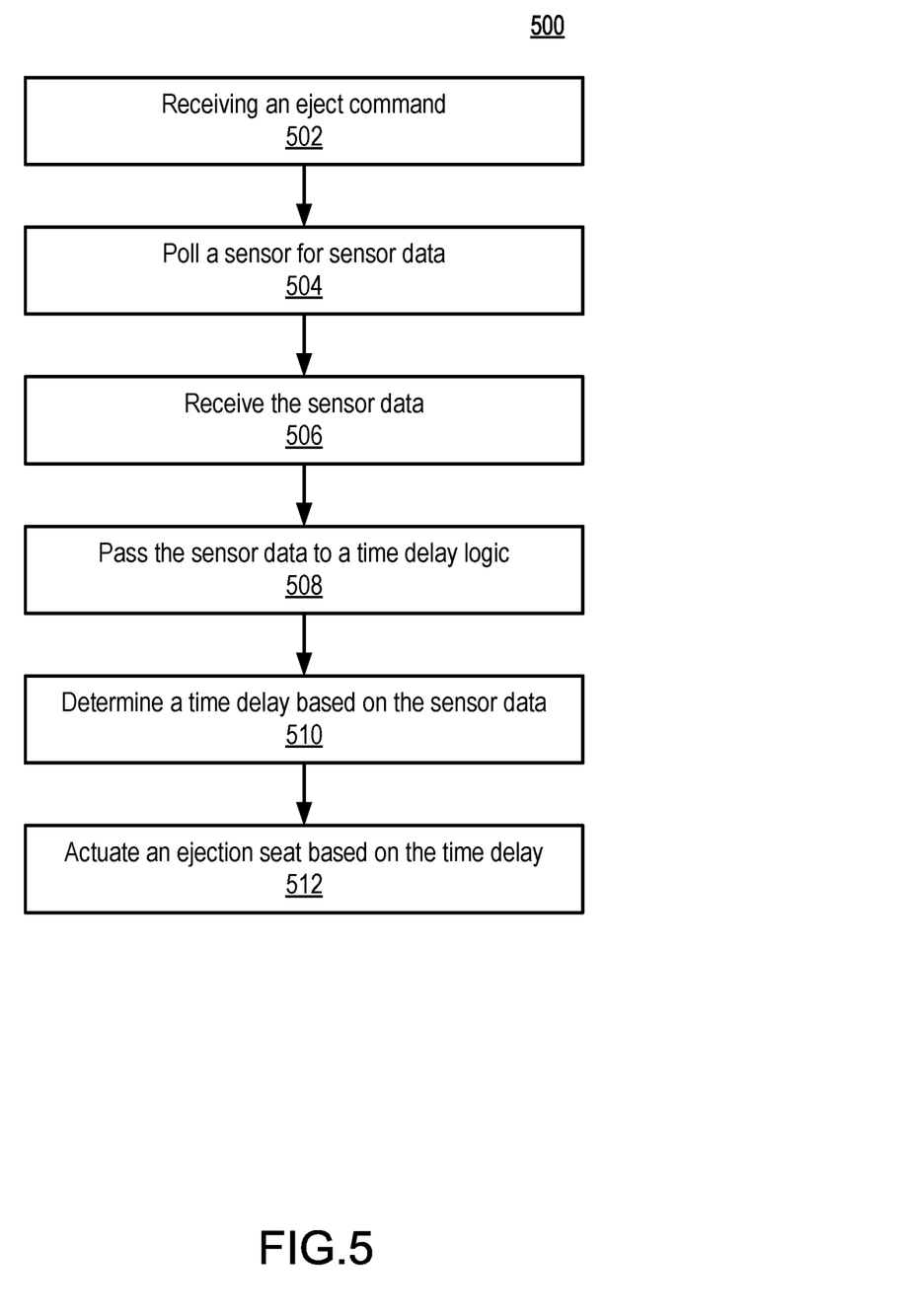
FIG. 5 illustrates a method of actuating an ejection system, in accordance with various embodiments.

In various embodiments, a method 500 of actuating an ejection system 10 is illustrated. Method 500 includes controller 202 receiving an eject command (step 502). For example, controller 202 may receive the eject command from the control interface 206 via ejection handle 106. Controller 202 may poll the sensors 204 for sensor data and thereby check the status of the sensors 204 for data integrity (step 504). Controller 202 may receive sensor data from the sensors 204 (step 506). For example, the controller may receive velocity data from a pitot tube integral to the ejection seat 14. Controller 202 may pass the sensor data to the time delay logic 208 (step 508). Controller may determine via the time delay logic 208 a time delay based on the sensor data (step 510). For example, the controller may compute the time delay based on a lookup table of canopy separation time and velocity. The controller may select a time delay greater than the canopy separation time. The controller may actuate the ejection seat 14 based on the time delay (step 512). For example, the controller may immediately actuate the canopy jettison system 212 in response to the eject command and may apply the selected time delay prior to actuation of the propulsion system 20.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A control system for an ejection system, comprising:
    a controller; and
    a tangible, non-transitory memory configured to communicate with the controller, the tangible, non-transitory memory having instructions stored thereon that, in response to execution by the controller, cause the controller to perform operations comprising:
        receiving, by the controller, an eject command;
        polling, by the controller, a sensor for a sensor data;
        receiving, by the controller, the sensor data;
        passing, by the controller, the sensor data to a time delay logic;
        receiving, by the controller, a mode select command from a control interface;
        passing, by the controller, the mode select command to a mode select logic;
        determining, by the controller and via the mode select logic, an ejection mode;
        passing, by the controller, the ejection mode to the time delay logic;
        determining, by the controller and via the time delay logic, a time delay based on the sensor data and the ejection mode;
        commanding, by the controller, actuation of a canopy jettison system based on the ejection mode; and
        commanding, by the controller, actuation of an ejection seat based on the time delay.

2. The control system for an ejection system of claim 1, wherein the operations further comprise:
    commanding, by the controller, actuation of a canopy jettison system based on the ejection mode.

3. The control system for an ejection system of claim 1, wherein the operations further comprise:
    rotating, by the controller, a rotatable component of an ordnance device; and
    enabling, by the controller, pyrotechnic communication with a pyrotechnic time delay based on the time delay and the rotation of the rotatable component.

4. The control system for an ejection system of claim 1, wherein the operations further comprise actuating, by the controller, the canopy jettison system.

5. The control system for an ejection system of claim 4, wherein the time delay logic comprises a lookup table of a canopy jettison system operation time indexed to the sensor data.

6. The control system for an ejection system of claim 1, wherein the sensor data includes at least one of a velocity, an airspeed, an altitude, an aircraft orientation, or an atmospheric condition.

7. The control system for an ejection system of claim 1, wherein the sensor and the controller are integrated onboard the ejection seat.

8. The control system for an ejection system of claim 1, wherein the sensor comprises a pitot tube.

9. A method of actuating an ejection system, comprising:
    receiving, by a controller, an eject command;
    polling, by the controller, a sensor for a sensor data;
    receiving, by the controller, the sensor data;
    passing, by the controller, the sensor data to a time delay logic;

receiving, by the controller, a mode select command from a control interface;

passing, by the controller, the mode select command to a mode select logic;

determining, by the controller and via the mode select logic, an ejection mode;

passing, by the controller, the ejection mode to the time delay logic;

determining, by the controller and via the time delay logic, a time delay based on the sensor data and the ejection mode; and commanding, by the controller, actuation of an ejection seat based on the time delay.

10. The method of claim 9, further comprising:

rotating, by the controller, a rotatable component of an ordnance device; and enabling, by the controller, pyrotechnic communication with a pyrotechnic time delay based on the time delay and the rotation of the rotatable component.

11. The method of claim 9, further comprising commanding, by the controller, actuation of a canopy jettison system.

12. The method of claim 11, wherein the time delay logic comprises a lookup table of a canopy jettison system operation time indexed to the sensor data.

13. The method of claim 9, wherein the sensor data includes at least one of a velocity, an airspeed, an altitude, an aircraft orientation, or an atmospheric condition.

14. An article of manufacture including a tangible, non-transitory computer-readable storage medium having instructions stored thereon that, in response to execution by a controller, cause the controller to perform operations comprising:

receiving, by the controller, an eject command;

polling, by the controller, a sensor for a sensor data;

receiving, by the controller, the sensor data;

passing, by the controller, the sensor data to a time delay logic;

receiving, by the controller, a mode select command from a control interface;

passing, by the controller, the mode select command to a mode select logic;

determining, by the controller and via the mode select logic, an ejection mode;

passing, by the controller, the ejection mode to the time delay logic;

determining, by the controller and via the time delay logic, a time delay based on the sensor data and the ejection mode; and commanding, by the controller, actuation of an ejection seat based on the time delay.

15. The article of manufacture of claim 14, wherein the operations further comprise:

rotating, by the controller, a rotatable component of an ordnance device; and enabling, by the controller, pyrotechnic communication with a pyrotechnic time delay based on the time delay and the rotation of the rotatable component.

16. The article of manufacture of claim 14, wherein the operations further comprise commanding, by the controller, actuation of a canopy jettison system.

17. The article of manufacture of claim 14, wherein the time delay logic comprises a lookup table of a canopy jettison system operation time indexed to the sensor data.

18. The article of manufacture of claim 14, wherein the sensor data includes at least one of a velocity, an airspeed, an altitude, an aircraft orientation, or an atmospheric condition.

* * * * *